US011582908B2

(12) United States Patent
Ito et al.

(10) Patent No.: US 11,582,908 B2
(45) Date of Patent: Feb. 21, 2023

(54) WORK MACHINE

(71) Applicant: HONDA MOTOR CO., LTD., Tokyo (JP)

(72) Inventors: Tomoki Ito, Wako (JP); Fumiya Isono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 351 days.

(21) Appl. No.: 16/765,493

(22) PCT Filed: Nov. 22, 2017

(86) PCT No.: PCT/JP2017/042069
§ 371 (c)(1),
(2) Date: May 20, 2020

(87) PCT Pub. No.: WO2019/102560
PCT Pub. Date: May 31, 2019

(65) Prior Publication Data
US 2020/0288635 A1 Sep. 17, 2020

(51) Int. Cl.
*A01D 34/81* (2006.01)
*B60L 50/64* (2019.01)
*A01D 34/68* (2006.01)
*A01D 34/78* (2006.01)
A01D 34/69 (2006.01)
A01D 101/00 (2006.01)

(52) U.S. Cl.
CPC ............ *A01D 34/81* (2013.01); *A01D 34/68* (2013.01); *A01D 34/78* (2013.01); *B60L 50/64* (2019.02); *A01D 34/69* (2013.01); *A01D 2101/00* (2013.01)

(58) Field of Classification Search
CPC .... A01D 2101/00; A01D 34/81; A01D 34/68; A01D 34/78; B60L 50/64
See application file for complete search history.

(56) References Cited

U.S. PATENT DOCUMENTS 5,606,851 A * 3/1997 Bruener ................. A01D 34/74
56/10.8
5,910,091 A * 6/1999 Iida ........................ A01D 69/02
56/320.1
(Continued)

FOREIGN PATENT DOCUMENTS

CN 205727119 11/2016
JP 54-045880 3/1979
(Continued)

OTHER PUBLICATIONS

International Search Report and Written Opinion for International Application No. PCT/JP2017/042069 dated Feb. 20, 2018, 10 pages.

*Primary Examiner* — Brian L Swenson
(74) *Attorney, Agent, or Firm* — Amin, Turocy & Watson, LLP

(57) ABSTRACT

This work machine is provided with a machine body equipped with a battery storage part for accommodating a battery. The machine body has a grip part on one side in the left-right direction. The battery storage part has an opening formed in the machine body and a lid capable of opening and closing the opening. The opening and the lid are provided on the other side of the machine body in the left-right direction.

11 Claims, 5 Drawing Sheets

(56) References Cited

U.S. PATENT DOCUMENTS

| | | | | |
|---|---|---|---|---|
| 9,127,658 B2* | 9/2015 | Koenen | ................ | H02J 7/0013 |
| 9,132,792 B2* | 9/2015 | Lyons | ................ | B60R 16/04 |
| 9,711,767 B2* | 7/2017 | Juenger | ................ | A01D 69/02 |
| 10,230,078 B2* | 3/2019 | Kubota | ................ | H01M 50/20 |
| 2003/0037525 A1* | 2/2003 | Iida | ................ | A01D 34/6812 |
| | | | | 56/11.9 |
| 2010/0269474 A1* | 10/2010 | Hansen | ................ | A01D 34/81 |
| | | | | 56/16.7 |
| 2012/0186887 A1 | 7/2012 | Moriguchi et al. | | |
| 2012/0317950 A1* | 12/2012 | Abe | ................ | A01D 34/81 |
| | | | | 56/11.9 |
| 2014/0083787 A1* | 3/2014 | Lyons | ................ | H01M 50/249 |
| | | | | 180/68.5 |
| 2020/0288634 A1* | 9/2020 | Hasegawa | ............ | A01D 34/81 |

FOREIGN PATENT DOCUMENTS

| | | |
|---|---|---|
| JP | 2009-146711 | 7/2009 |
| JP | 2011-182739 | 9/2011 |
| JP | 2011-194982 | 10/2011 |
| JP | 2013-051827 | 3/2013 |
| JP | 2013-180543 | 9/2013 |
| JP | 2016-144965 | 8/2016 |

* cited by examiner

C # WORK MACHINE

TECHNICAL FIELD

The present invention relates to a work machine including a machine body provided with a lid of a battery storage portion.

BACKGROUND ART

Rotary lawn mowers are known as a type of work machines, for example. The rotary lawn mowers cut the grass on lawns by rotating along the grass a cutter blade accommodated in a housing having an opened bottom. A lawn mower of this type having a motor as a driving source and a battery as a power supply is disclosed in Chinese Utility Model Registration No. 205727119, for example.

SUMMARY OF INVENTION

In maintenance work of such a work machine, the machine body may be turned over sideways in order to wash the bottom of the work machine (e.g. the cutter blade). In this case, water may enter from the gap of the lid of the battery storage portion formed in the machine body and then the battery may get wet with the water.

The present invention has been devised considering such a problem, and an object of the present invention is to provide a work machine that can prevent the entry of water into the battery storage portion even when the work machine is washed with the machine body turned over sideways.

In order to achieve the object above, the present invention is directed to a work machine including a machine body having a battery storage portion configured to store a battery, wherein the machine body includes a grip on one side thereof in a right-left direction, the battery storage portion includes an opening formed in the machine body, and a lid configured to open and close the opening, and the opening and the lid are provided on another side of the machine body in the right-left direction.

According to the work machine of the present invention, when turning over the machine body sideways to wash the bottom of the work machine, the operator lifts up the grip to turn over the machine body sideways. In this case, the lid of the battery storage portion disposed on the side opposite to the grip lies on the lower side (on the ground side). Consequently, the entry of water into the battery storage portion is prevented even when the work machine is turned over sideways and washed. This prevents the battery from getting wet with the water and protects the battery reliably.

The lid may be supported by a hinge and configured to open and close in a horizontal direction, and the hinge may be disposed on a front side of the lid.

With this configuration, even if the work machine runs into an obstacle like a hedge etc., the force acts on the work machine only in the direction in which the lid closes. This prevents the lid from opening and certainly protects the battery.

A waterproof structure may be provided between an inner peripheral edge of the opening and an outer peripheral edge of the lid.

With this configuration, the entry of water into the battery storage portion is prevented even when the work machine is washed with the machine body turned over sideways such that the lid lies on the upper side.

The waterproof structure may include a labyrinth structure.

It is thus possible to prevent the entry of water into the battery storage portion with a simple structure.

The waterproof structure may include a waterproof packing.

This effectively prevents the entry of water into the battery storage portion.

The work machine may be a rotary lawn mower in which a cutter blade configured to rotate around a vertical axis is disposed at a bottom thereof.

As a result, the battery mounted in the rotary lawn mower can be protected reliably.

The machine body may include a housing constituting an exterior shape of the machine body, and a battery case disposed in the housing and configured to hold the battery, and the battery case may include an upper wall, a lower wall, a front wall, and a rear wall, and further include a side wall disposed on the one side in the right-left direction.

With this configuration, when the work machine is washed with the machine body turned over sideways such that the grip lies on the upper side, even if water enters the housing from the side on which the grip is provided (the side opposite to the lid), the battery is prevented from getting wet with the water since the battery is covered by the battery case. This protects the battery reliably.

A groove may be formed in the lid on a rear side thereof in the direction of travel.

With this configuration, the operator can remove the battery without the need to walk to the front of the machine body after work, since the groove for opening the lid is disposed on the rear side of the lid in the direction of travel.

The grip may be positioned in a vicinity of a middle of the machine body in a direction of travel.

With this configuration, the grip is positioned near the center of gravity of the work machine and so the operator can lift up the machine body easily.

In top view, an upper side of the lid when closed may fit in a contour of a portion of a housing that constitutes an exterior shape of the machine body, the portion constituting an upper side of the opening.

With this configuration, it is possible to prevent the entry of water into the battery storage portion even if it rains, for example.

The machine body may include a housing constituting an exterior shape of the machine body, the housing may include a bulging portion protruding toward the other side in the right-left direction, and the opening may be disposed under the bulging portion.

With this configuration, the operator can easily catch the lid with a hand and the lid can be opened and closed further easily.

According to the work machine of the present invention, it is possible to prevent the entry of water into the battery storage portion even when the work machine is washed with the machine body turned over sideways.

DESCRIPTION OF EMBODIMENTS

The work machine according to the present invention will be described below referring to the accompanying drawings in conjunction with preferred embodiments.

Figure 1:
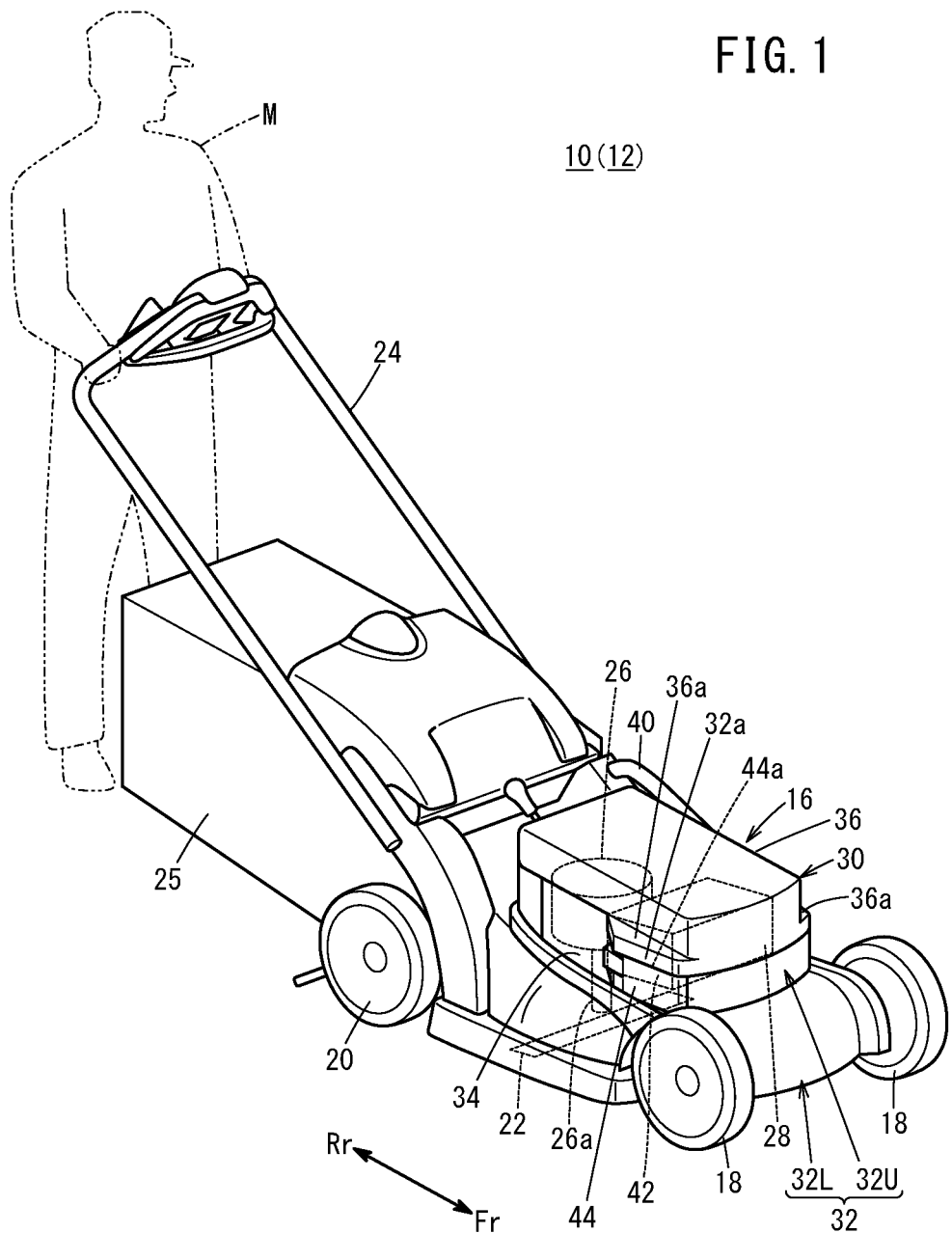
FIG. 1 is a perspective view of a work machine (lawn mower) according to an embodiment of the present invention.

A work machine 10 according to an embodiment shown in FIG. 1 is a walk-type self-propelled lawn mower 12 for cutting the grass on lawns. In FIG. 1, the arrow Fr shows the forward direction of the lawn mower 12 (the same direction as the forward direction seen from an operator M) and the arrow Rr shows the rearward direction of the lawn mower 12 (the same direction as the rearward direction seen from the operator M). "Right side" and "left side" of the lawn mower 12 respectively denote the right side and the left side seen from the operator M who uses the lawn mower 12.

The lawn mower 12 includes a machine body 16, right and left front wheels 18 disposed in a front part of the machine body 16, right and left rear wheels 20 disposed in a rear part of the machine body 16, a grass-cutting cutter blade 22 disposed at the bottom of the machine body 16, an operation handle 24 extending rearward from the machine body 16, and a mown grass storage 25 attached at the rear of the machine body 16.

The machine body 16 includes a motor 26 serving as the driving source of the cutter blade 22 and the rear wheels 20, and a battery storage portion 30 for accommodating a battery 28 for supplying electric power to the motor 26. The machine body 16 has a housing 32 that constitutes the exterior shape of the machine body 16. The housing 32 is a casing that is opened downward only in a part facing the ground (lawn).

The housing 32 includes a lower housing 32L opened downward and an upper housing 32U protruding upward from the top of the lower housing 32L. The lower housing 32L contains the cutter blade 22 therein. The upper housing 32U includes a peripheral wall 34 standing from the top surface of the lower housing 32L, and a top cover 36 attached to the peripheral wall 34. The top cover 36 has a pair of bulging portions 36a bulging in the right and left directions, respectively.

The motor 26 is disposed (accommodated) in the upper housing 32U. The motor 26 is located in a position closer to the rear in the upper housing 32U. The motor 26 has an output shaft 26a projecting downward and extending into the housing 32. The driving force generated by the motor 26 is transmitted to the right and left rear wheels 20 as the travel driving force through a travel motive power transmission mechanism (not shown) coupled to the output shaft 26a. The driving force generated by the motor 26 may be transmitted to the right and left front wheels 18.

The cutter blade 22 is coupled to the output shaft 26a of the motor 26 through a blade holder (not shown), and is rotated by the rotational driving force transmitted from the output shaft 26a. The cutter blade 22 is a plate-like elongated member (so-called bar blade).

Figure 5:
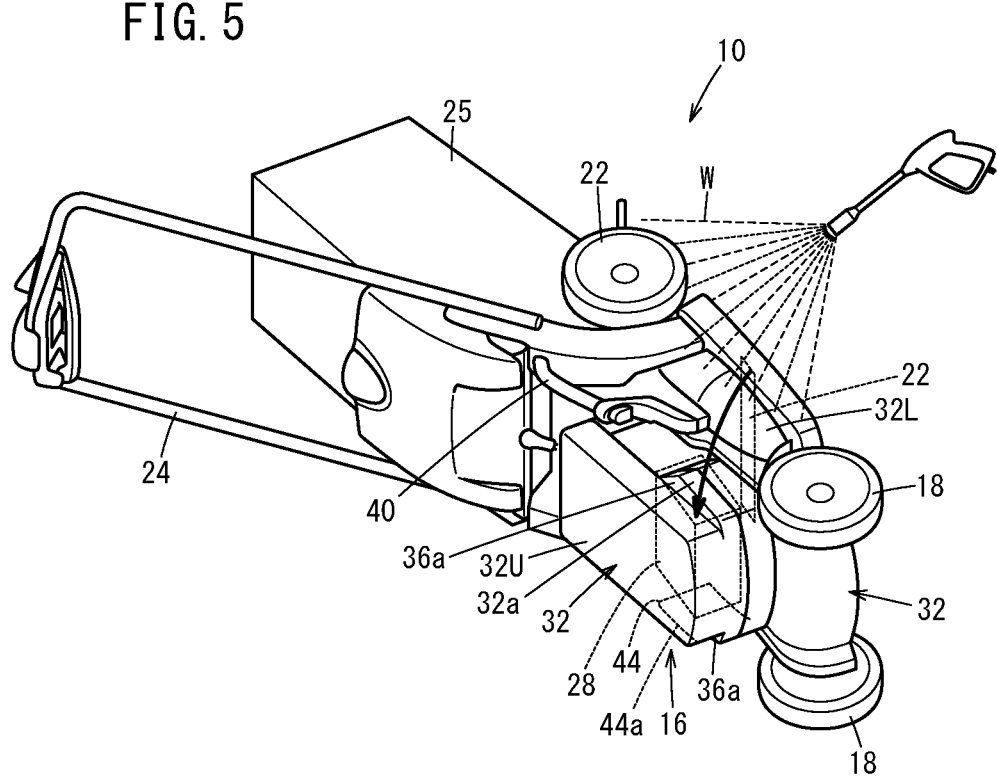
FIG. 5 is a perspective view illustrating a state in which the work machine is turned over sideways for washing.

The machine body 16 has, on one side in the right-left direction, a grip 40 that the operator M can grasp in order to turn over the machine body 16 sideways (see FIG. 5). In this embodiment, the grip 40 is located on the left side of a rear part of the lower housing 32L and protrudes upward from the top surface of the lower housing 32L. The grip 40 is located in the vicinity of the middle of the machine body 16 in the direction of travel (between the motor 26 and the rear wheels 20).

The grip 40 is shaped in the form of a bar extending in the front-rear direction so that the operator M can grasp the grip 40 easily to turn over the machine body 16 sideways. The grip 40 may be a groove in which the operator M can put fingers to catch it.

Figure 2:
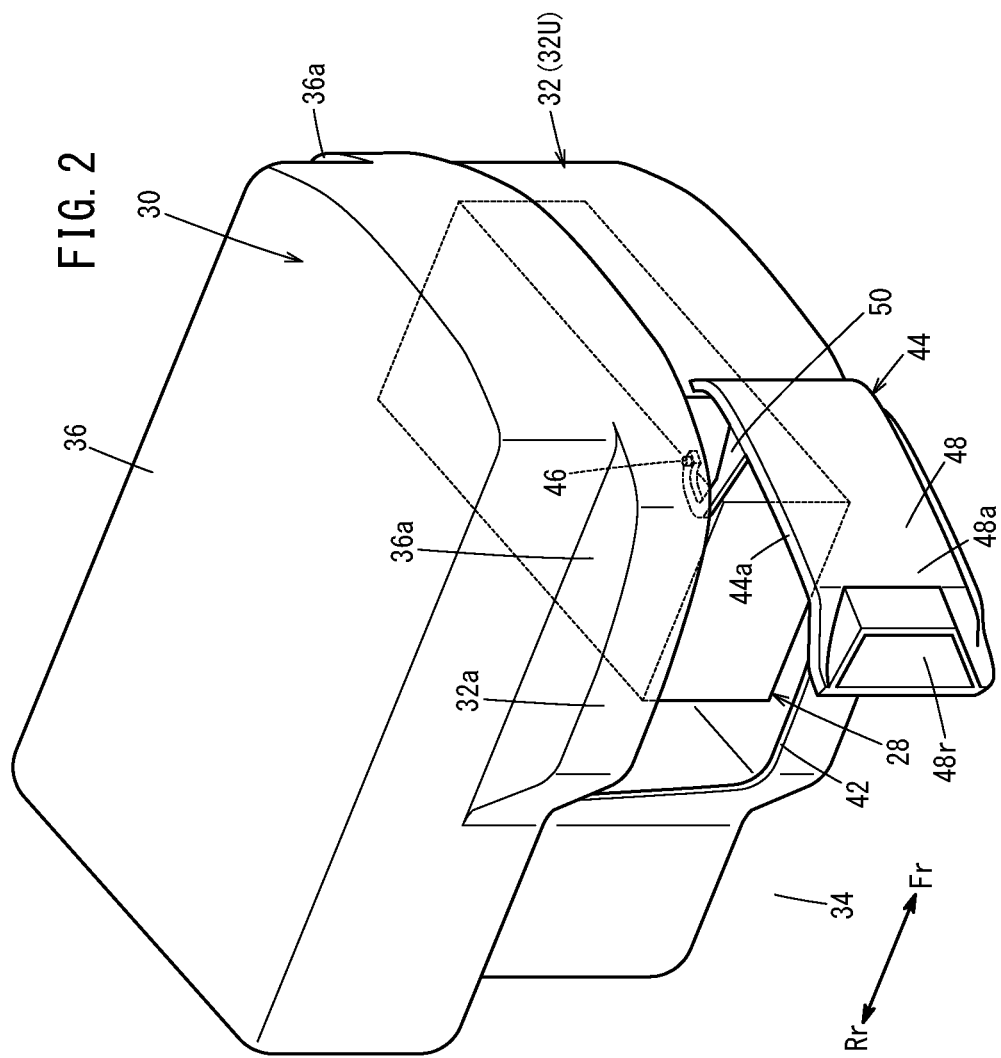
FIG. 2 is a perspective view showing a state in which a lid is opened.

As shown in FIGS. 1 and 2, the battery storage portion 30 has an opening 42 formed in the machine body 16, and a lid 44 that can open and close the opening 42. The opening 42 and the lid 44 are positioned on the other side of the machine body 16 in the right-left direction. As shown in FIG. 2, the opening 42 is formed in the peripheral wall 34 of the upper housing 32U (specifically, in the wall on the right side). FIG. 2 shows a state in which the lid 44 is opened. The opening 42 passes through the peripheral wall 34 in its thickness direction, and the opening 42 is sized such that the battery 28 can pass therethrough when the battery 28 is inserted into and removed out from the inside (battery accommodating cavity) of the battery storage portion 30.

The lid 44 is supported by hinges 46 and can open and close in a horizontal direction. The hinges 46 are disposed on the front side of the lid 44. Specifically, the lid 44 includes a plate-like lid body 48 having a contour fitting the opening 42, and coupling arms 50 projecting from the lid body 48. A groove 48r that the operator M can catch with fingers is formed in an outside surface 48a of the lid body 48 (the surface that is exposed outside of the battery storage portion 30 when the lid 44 is closed), in a rear part of the lid body 48 (the rear part viewed when the lid 44 is closed). The operator M can easily open the lid 44 by catching the groove 48r with fingers. In top view, an upper side 44a of the lid 44 when closed fits in the contour of a portion 32a of the housing 32 (upper housing 32U) that constitutes an upper side of the opening 42. The lid 44 is disposed under one of the bulging portions 36a of the housing 32.

Figure 3:
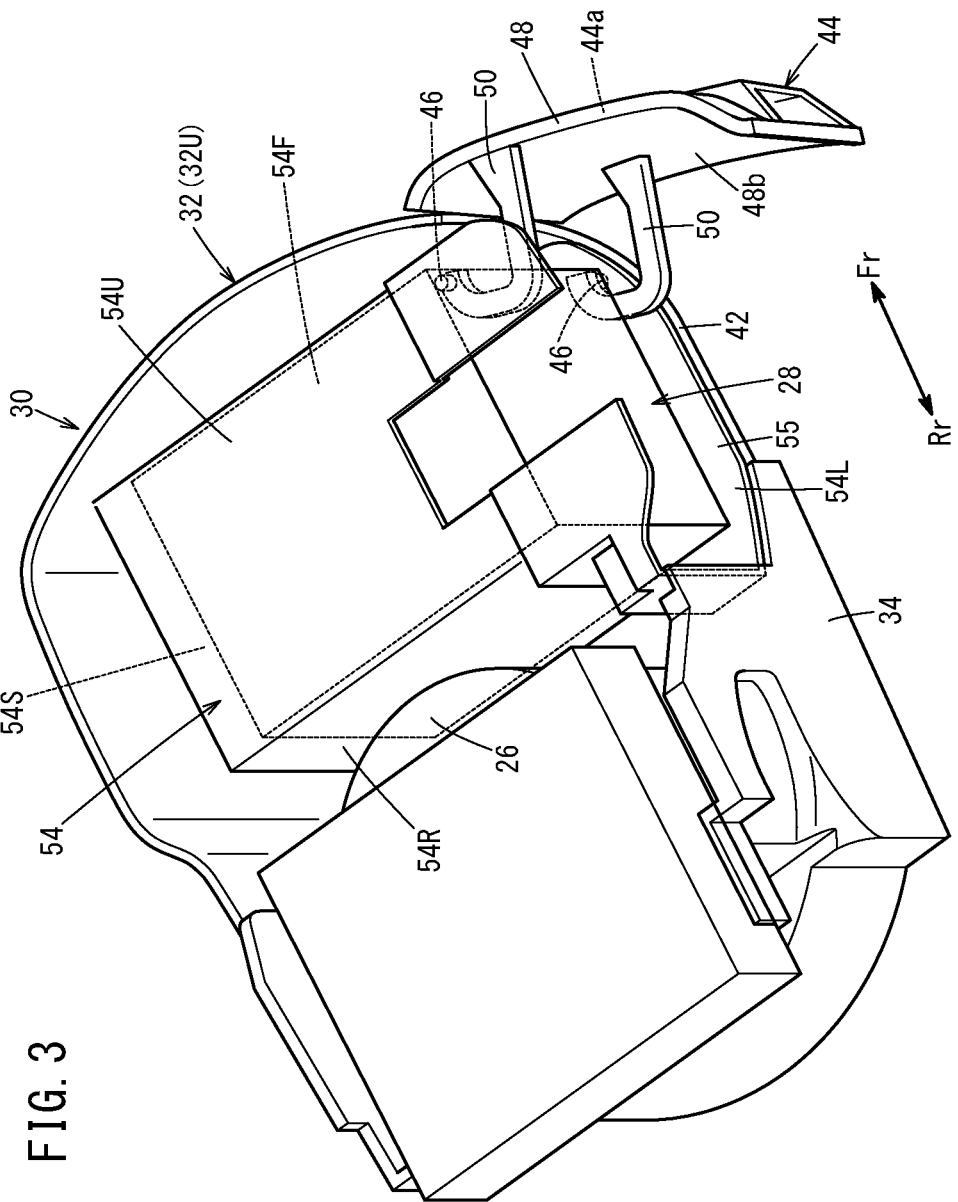
FIG. 3 is a perspective view showing a state in which the lid is opened, and a top cover has been removed.

The coupling arms 50 project from a back surface 48b of the lid body 48 (the surface that constitutes an inner surface of the battery storage portion 30 when the lid 44 is closed: see FIG. 3) and curve toward the front of the lid 44. Free ends of the coupling arms 50 are pivotably supported inside the upper housing 32U to form the hinges 46. The lid 44 is supported on the upper housing 32U in such a way that it can turn (swing) around a vertical axis by the hinges 46 placed on the front side of the lid 44. Accordingly, the lid 44 turns to move frontward when it opens and turns to move rearward when it closes.

As shown in FIG. 3, the machine body 16 has a battery case 54 placed in the housing 32 and capable of holding the battery 28. The battery 28 is shaped in the form of a cuboid. The battery case 54 is fixed to the housing 32 (upper housing 32U) and configured to hold the battery 28 in such a manner that the longitudinal direction of the battery 28 lies in the right-left direction of the machine body 16 (in the width direction of the lawn mower 12). The battery case 54 is disposed closer to the front than the motor 26 in the housing 32.

Specifically, the battery case 54 has an upper wall 54U, a lower wall 54L, a front wall 54F, and a rear wall 54R, and further has a side wall 54S disposed on one side in the right-left direction (the wall on the left side in the drawing). The outer peripheral portion of the side wall 54S is continuous to the upper wall 54U, the lower wall 54L, the front wall 54F, and the rear wall 54R. The battery case 54 has, on the other side in the right-left direction, a case opening 55 that opens in the opening 42 formed in the housing 32. The battery 28 is attached into and removed from the battery case 54 through the case opening 55.

Figure 4:
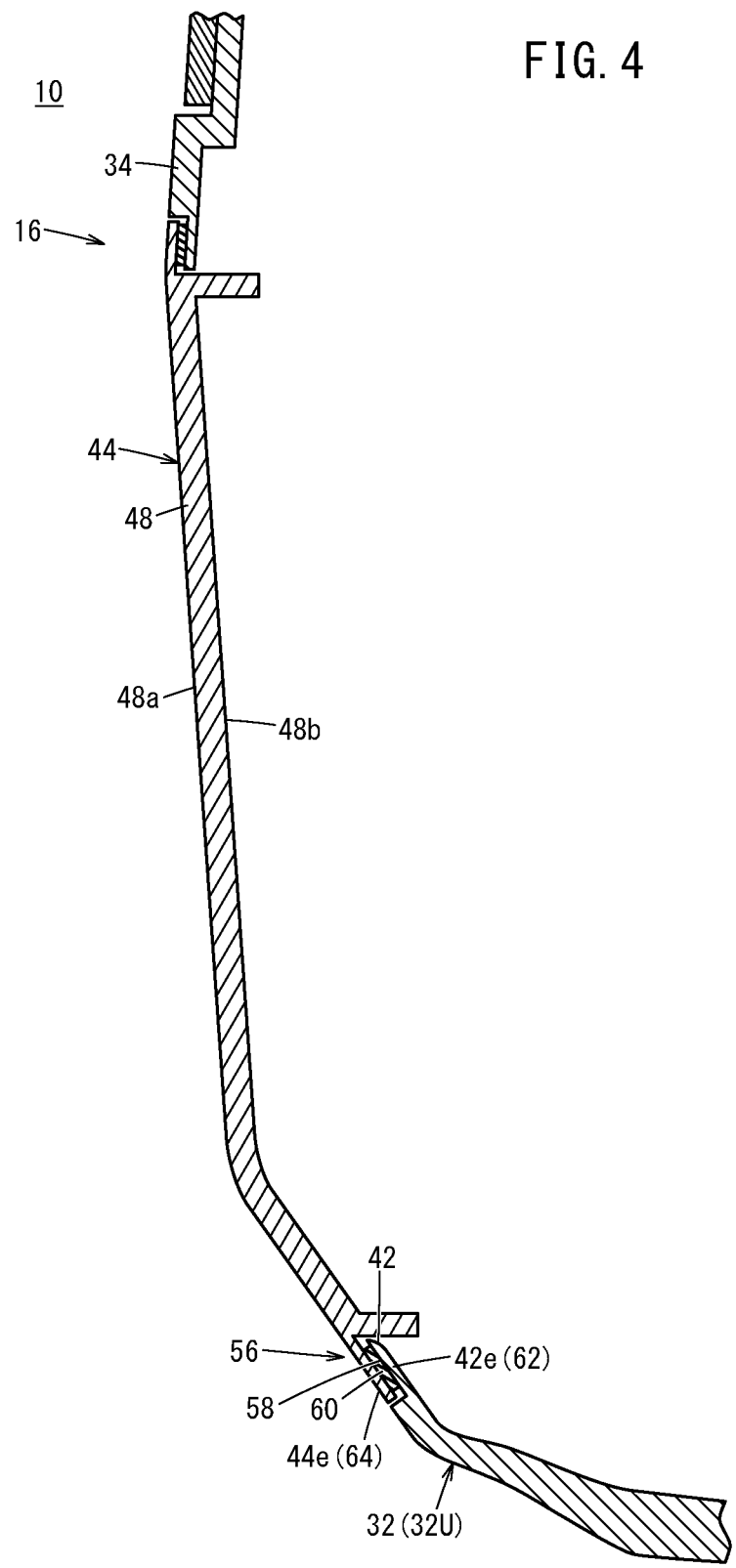
FIG. 4 is a cross sectional view of the lid and its vicinity.

As shown in FIG. 4, a waterproof structure 56 for preventing the entry of water into the battery storage portion 30 from outside is provided between an inner peripheral edge 42e of the opening 42 and an outer peripheral edge 44e of the lid 44. In this embodiment, the waterproof structure 56 includes a labyrinth structure 58 and a waterproof packing 60.

The labyrinth structure 58 has a configuration in which overlapping portions (borders) of mutually facing members bend multiple times. Specifically, the labyrinth structure 58 includes an inner protrusion 62 formed on an inner periphery of the opening 42, and an outer protrusion 64 formed on an outer periphery of the lid 44. The inner protrusion 62 is formed over the entire inner periphery of the opening 42. The outer protrusion 64 is formed over the entire outer periphery of the lid 44. When the lid 44 is closed, the inner protrusion 62 and the outer protrusion 64 overlap in the thickness direction of the lid 44.

The waterproof packing 60 is made of an elastic member such as elastomer material, and is configured like a ring along the shape of the opening 42. The waterproof packing 60 may be a foam rubber seal, for example. The waterproof packing 60 is fixed on the inner protrusion 62 of the opening 42 or the outer protrusion 64 of the lid 44. The waterproof packing 60 need not be provided. The labyrinth structure 58 need not be provided, in which case the waterproof packing 60 is provided on the inner peripheral edge 42e of the opening 42 or the outer peripheral edge 44e of the lid 44.

Next, operations of the work machine 10 (lawn mower 12) constructed as above will be described.

With the lawn mower 12 shown in FIG. 1, when the cutter blade 22 rotates clockwise in plan view under the driving action of the motor 26, the cutter blade 22 cuts the grass on the lawn right beneath the lawn mower 12. At this time, an air current (swirling wind) swirling in the same direction as the cutter blade 22 is generated inside the lower housing 32L. Then, the cut grass (mown grass) is sent into the mown grass storage 25 by the conveying wind (swirling wind) thus generated.

When the lawn mower 12 cuts grass, the grass etc. adhere to the bottom of the lawn mower 12 (the cutter blade 22 and its vicinity), and so washing the bottom is needed. Accordingly, as shown in FIG. 5, the lawn mower 12 has to be turned over sideways so that water can be sprayed onto the bottom of the lawn mower 12. In this case, the operator M holds the grip 40 on the machine body 16 to turn over the lawn mower 12 sideways (such that the width direction of the lawn mower 12 lies in the vertical direction). When the lawn mower 12 is thus turned over sideways, water is sprayed onto the cutter blade 22 and its vicinity to wash the cutter blade 22 and its vicinity with water W. In this work, portions of the work machine 10 other than the bottom may be sprayed with water W.

In this case, the work machine 10 (lawn mower 12) of this embodiment offers the effects below.

When turning over the machine body 16 sideways to wash the bottom of the work machine 10, the operator M holds and lifts up the grip 40 provided on one side of the machine body 16 in the right-left direction (on the left side in this embodiment), so as to turn over the work machine 10 sideways (such that the width direction of the work machine 10 lies in the vertical direction). As a result, the one side of the machine body 16 in the right-left direction lies on the upper side in the vertical direction, and the opposite side of the machine body 16, i.e. the other side of the machine body 16 in the right-left direction (the right side in this embodiment), lies on the lower side in the vertical direction, i.e. on the ground side. Consequently, the entry of water W into the battery storage portion 30 is prevented even when the work machine 10 is turned over sideways and washed. This prevents the battery 28 from getting wet with the water and protects the battery 28 reliably.

As shown in FIG. 2, the lid 44 is supported by the hinges 46 and can open and close in the horizontal direction, and the hinges 46 are disposed on the front side of the lid 44. With this configuration, even if the work machine 10 runs into an obstacle like a hedge etc., the force acts on the work machine 10 only in the direction in which the lid 44 closes. This prevents the lid 44 from opening and certainly protects the battery 28.

As shown in FIG. 4, the waterproof structure 56 is provided between the inner peripheral edge 42e of the opening 42 and the outer peripheral edge 44e of the lid 44. With this configuration, the entry of water W into the battery storage portion 30 is prevented even when the work machine 10 is washed with the machine body 16 turned over sideways such that the lid 44 lies on the upper side.

The waterproof structure 56 includes the labyrinth structure 58. It is thus possible to prevent the entry of water W into the battery storage portion 30 with a simple structure.

The waterproof structure 56 has the waterproof packing 60. This effectively prevents the entry of water W into the battery storage portion 30.

As shown in FIG. 1, the work machine 10 is the rotary lawn mower 12 in which the cutter blade 22 that can rotate around a vertical axis is disposed at the bottom thereof. As a result, the battery 28 mounted in the rotary lawn mower 12 can be protected reliably.

As shown in FIG. 3, the machine body 16 includes the housing 32 constituting the exterior shape of the machine body 16, and the battery case 54 disposed in the housing 32 and capable of holding the battery 28. The battery case 54 includes the upper wall 54U, the lower wall 54L, the front wall 54F, and the rear wall 54R, and further includes the side wall 54S disposed on one side in the right-left direction. With this configuration, when the work machine 10 is washed with the machine body 16 turned over sideways such that the grip 40 lies on the upper side, even if water W enters the housing 32 from the side on which the grip 40 is provided (the side opposite to the lid 44), the battery 28 is prevented from getting wet with the water since the battery 28 is covered by the battery case 54. This protects the battery 28 reliably.

The groove 48r is formed in the lid 44 on the rear side thereof in the direction of travel. With this configuration, the operator M can remove the battery 28 without the need to walk to the front of the machine body after work.

The grip 40 is positioned in the vicinity of the middle of the machine body 16 in the direction of travel. With this configuration, the grip 40 is positioned near the center of gravity of the work machine 10 and so the operator M can lift up the machine body 16 easily.

In top view, the upper side 44a of the lid 44 when closed fits in the contour of the portion 32a of the housing 32 that constitutes the exterior shape of the machine body 16, the portion constituting the upper side of the opening 42. With this configuration, it is possible to prevent the entry of water into the battery storage portion 30 even if it rains, for example.

The opening 42 is disposed under the bulging portion 36a of the housing 32. With this configuration, the operator M can easily catch the lid 44 with a hand and the lid 44 can be opened and closed further easily.

The work machine 10 may be provided with an engine as a prime mover. The work machine 10 may be provided with an engine and the motor 26 as prime movers. The battery 28 need not necessarily be a power supply for the motor 26 but may be provided to supply electric power to other components.

The grip 40 may be positioned on the right side of the machine body 16, and the opening 42 and the lid 44 may be positioned on the left side of the machine body 16.

The present invention is not limited to the above-described embodiments but can be modified in various ways without departing from the essence and gist of the present invention.

What is claim is:

1. A work machine comprising a machine body including a battery storage portion configured to store a battery, wherein
   the machine body includes, on one side thereof in a right-left direction, a grip configured to be grasped by an operator for turning the machine body over sideways,
   the battery storage portion includes an opening formed in the machine body, and a lid configured to open and close the opening, and
   the opening and the lid are provided on another side of the machine body in the right-left direction.

2. The work machine according to claim 1, wherein a waterproof structure is provided between an inner peripheral edge of the opening and an outer peripheral edge of the lid.

3. The work machine according to claim 2, wherein the waterproof structure includes a labyrinth structure.

4. The work machine according to claim 2, wherein the waterproof structure includes a waterproof packing.

5. The work machine according to claim 1, wherein the work machine is a rotary lawn mower in which a cutter blade configured to rotate around a vertical axis is disposed at a bottom thereof.

6. The work machine according to claim 1, wherein the grip is positioned in a vicinity of a middle of the machine body in a direction of travel.

7. The work machine according to claim 1, wherein, in top view, an upper side of the lid when closed fits in a contour of a portion of a housing that constitutes an exterior shape of the machine body, the portion constituting an upper side of the opening.

8. The work machine according to claim 1, wherein
   the machine body includes a housing constituting an exterior shape of the machine body,
   the housing includes a bulging portion protruding toward the other side in the right-left direction, and
   the lid is disposed under the bulging portion.

9. A work machine comprising a machine body including a battery storage portion configured to store a battery, wherein
   the machine body includes a grip on one side thereof in a right-left direction,
   the battery storage portion includes an opening formed in the machine body, and a lid configured to open and close the opening, and
   the opening and the lid are provided on another side of the machine body in the right-left direction, wherein
   the lid is supported by a hinge and is configured to open and close in a horizontal direction, and
   the hinge is disposed on a front side of the lid.

10. The work machine according to claim 9, wherein a groove is formed in the lid on a rear side thereof in a direction of travel.

11. A work machine comprising a machine body including a battery storage portion configured to store a battery, wherein
    the machine body includes a grip on one side thereof in a right-left direction,
    the battery storage portion includes an opening formed in the machine body, and a lid configured to open and close the opening, and
    the opening and the lid are provided on another side of the machine body in the right-left direction, wherein
    the machine body includes a housing constituting an exterior shape of the machine body, and a battery case disposed in the housing and configured to hold the battery, and
    the battery case includes an upper wall, a lower wall, a front wall, and a rear wall, and further includes a side wall disposed on the one side in the right-left direction.

* * * * *